United States Patent [19]

Iwama

[11] Patent Number: 5,634,709
[45] Date of Patent: Jun. 3, 1997

[54] INNER MIRROR OF A VEHICLE HAVING A DISPLAY DEVICE

[75] Inventor: Tokumitsu Iwama, Shimizu, Japan

[73] Assignee: Murakami Corporation, Japan

[21] Appl. No.: 562,758

[22] Filed: Nov. 27, 1995

[30] Foreign Application Priority Data

Dec. 27, 1994 [JP] Japan ................................ 6-341180

[51] Int. Cl.$^6$ .............................. B60R 1/12; G02R 27/01
[52] U.S. Cl. .................... 362/83.1; 362/80.1; 359/630; 345/7
[58] Field of Search .......................... 362/74, 80.1, 83.1, 362/83.3; 340/435, 461; 345/7, 9; 359/630, 839

[56] References Cited

U.S. PATENT DOCUMENTS

| | | | |
|---|---|---|---|
| 3,366,950 | 1/1968 | Wilson | 345/7 |
| 5,037,182 | 8/1991 | Groves et al. | |
| 5,099,229 | 3/1992 | Aoki | 345/7 |
| 5,223,814 | 6/1993 | Suman | 340/461 |
| 5,408,357 | 4/1995 | Beukema | 362/83.1 |

FOREIGN PATENT DOCUMENTS

| | | |
|---|---|---|
| 59-130754 | 7/1984 | Japan. |
| 60-088926 | 5/1985 | Japan. |

*Primary Examiner*—Y My Quach
*Attorney, Agent, or Firm*—Hedman, Gibson & Costigan, P.C.

[57] ABSTRACT

An inner mirror of a vehicle having a display device includes a mirror body, a rear view mirror provided in a front opening of the mirror body for reflecting an image in the rear of a vehicle back to a driver's visual point, an information display section provided within an area of the rear view mirror in the front opening of the mirror body or within an area adjacent to the area of the rear view mirror, a light emitting display section provided in the mirror body for displaying visual information by emission of light, and an information display mirror provided in the mirror body for reflecting the visual information displayed by the light emitting display section back to the driver's visual point through the information display section.

3 Claims, 4 Drawing Sheets

INNER MIRROR OF A VEHICLE HAVING A DISPLAY DEVICE

BACKGROUND OF THE INVENTION

This invention relates to an inner mirror of a vehicle and, more particularly, to an inner mirror of a vehicle capable of facilitating watching of visual information in the form of emitted light relating to distance of an obstacle located in the rear of a vehicle.

Various proposals have been made for warning a driver of a vehicle against an obstacle located in the rear of the vehicle when the vehicle is driven rearwardly for, e.g., putting it into a garage. For example, Japanese Patent Application Laid-open No. Sho 59-120877 discloses a device according to which an image in the rear of a vehicle is taken by a television camera and this image is displayed in a CRT provided in a meter panel in front of a driver's seat. Moreover, according to this device, an ultrasonic transmitter and an ultrasonic receiver are provided on a rear bumper to measure distance of an obstacle located in the rear of the vehicle and the measured distance is displayed numerically on the CRT in a form superposed on the image in the rear of the vehicle. This device, however, requires a relatively large scale device such as a television camera and a CRT and therefore is very costly.

For overcoming the problem of this device, Japanese Patent Publication No. Hei 4-25174 proposes an improvement according to which a light emitting device such as a fluorescent character display tube is provided in a part of an inner mirror to display distance of an obstacle located in the rear of a vehicle detected by an obstacle detection sensor. By this arrangement, a driver can watch information relating to the distance of the obstacle located in the rear of the vehicle while he watches an image in the rear of the vehicle over the inner mirror.

According to the device disclosed in Japanese Patent Publication No. Hei 4-25174, the display by the light emitting device is made on a mirror surface and, therefore, distance between a driver's visual point and the display position is smaller than distance between the driver's visual point and an image in the rear of the vehicle reflected by the inner mirror. For this reason, the driver cannot focus his eye both at the display made by the light emitting device and at the image in the rear of the vehicle simultaneously and, accordingly, it is difficult for him to watch the display and the rear image simultaneously. The driver therefore is obliged to watch the display and the rear image alternately but this requires a large amount of shifting of the focus and hence focusing causes fatigue and trouble to the driver.

For overcoming this problem, it is conceivable to provide the light emitting device at a deep position in the mirror body to prolong the distance between the driver's visual point and the light emitting display. This however requires extension of the depth of the mirror body with the result that such a deep mirror body will become an obstacle to driving.

It is, therefore, an object of the invention to provide an inner mirror having a display device which, when information is displayed by light emitting display means provided in the inner mirror, enables an image in the rear of the vehicle and a light emitted display to be watched easily without shifting the driver's focus largely and without enlarging the size of the mirror body.

SUMMARY OF THE INVENTION

An inner mirror of a vehicle having a display device achieving the above described object of the invention comprises a mirror body, a rear view mirror provided in a front opening of the mirror body for reflecting an image in the rear of a vehicle back to a driver's visual point, an information display section provided within an area of the rear view mirror in the front opening of the mirror body or within an area adjacent to the area of the rear view mirror, light emitting display means provided in the mirror body for displaying visual information by emission of light, and an information display mirror provided in the mirror body for reflecting the visual information displayed by the light emitting display means back to the driver's visual point through the information display section.

According to the invention, since the visual information displayed by the light emitting display means is reflected by the information display mirror back to the driver's visual point through the information display section, the display position of visual information can be extended away from the driver's visual point. Accordingly, the difference in distance between the image in the rear of the vehicle reflected by the rear view mirror and the visual information is minimized so that the rear image and the visual information can be watched simultaneously and easily. When the rear view and the visual information are watched alternately, the amount of shifting of focus is reduced so that the driver's focusing is facilitated and his fatigue and trouble are thereby mitigated. Besides, since an optical path is extended by reflection of the visual information by the information display mirror, the display position of the visual information can be extended away from the driver's visual point without enlarging the depth of the mirror body whereby enlargement of the mirror body can be prevented.

In one aspect of the invention, the inner mirror further comprises slits for deviating the visual information displayed by the light emitting display means in the direction of the information display mirror.

When light is emitted by the light emitting display means in the mirror body, light diffused in the mirror body is likely to disclose the inside state of the inner mirror to the driver. For preventing this, the slits are provided to deviate the visual information in the direction of the information display mirror. By this arrangement, diffusion of light is prevented and, therefore, disclosure of the inside state of the inner mirror to the driver is prevented.

In another aspect of the invention, the visual information displayed by the light emitting display means is information relating to distance of an obstacle located in the rear of the vehicle.

According to this aspect of the invention, the driver can recognize the distance of the obstacle located in the rear of the vehicle while watching the image in the rear of the vehicle and, therefore, he can easily drive the vehicle rearwardly for, e.g., putting it into the garage.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
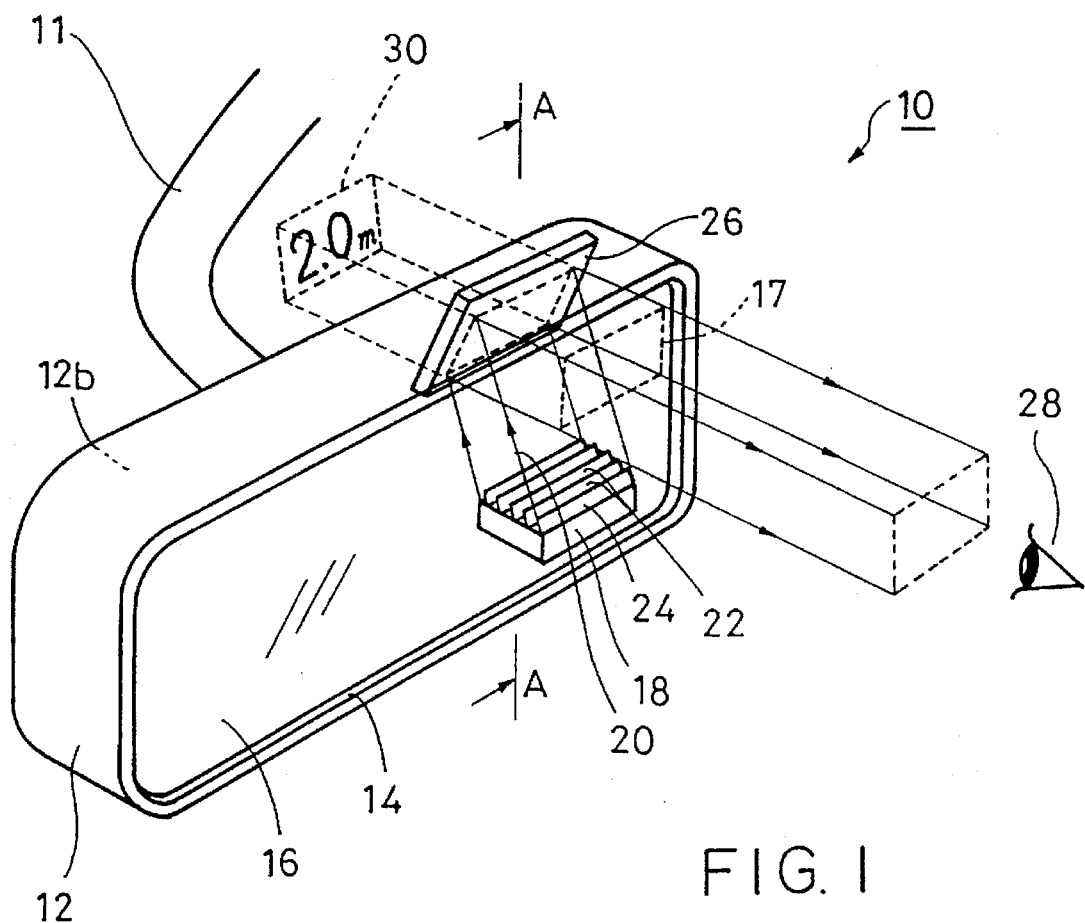
FIG. 1 is a perspective view showing an embodiment of the invention.

An embodiment of the invention will now be described. FIG. 1 shows an inner mirror 10 to which the invention has been applied with a part thereof seen through a mirror body 12. The inner mirror 10 is secured to a ceiling of a vehicle by means of a bracket 11 at an obliquely front and slightly upper position with respect to a driver. In the inner mirror 10, a rear view mirror 16 is fitted in a front opening 14 of the box-shaped mirror body 12. An information display section 17 for transmitting visual information in formed in a part of the rear view mirror 16.

Figure 2:
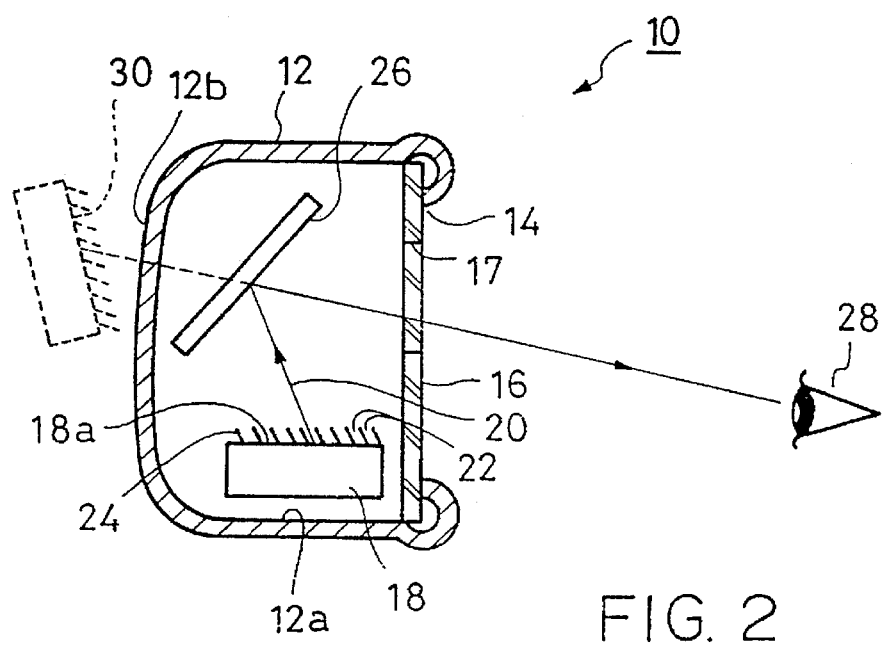
FIG. 2 is a sectional view of the same embodiment taken along arrows A—A.
Figure 3:
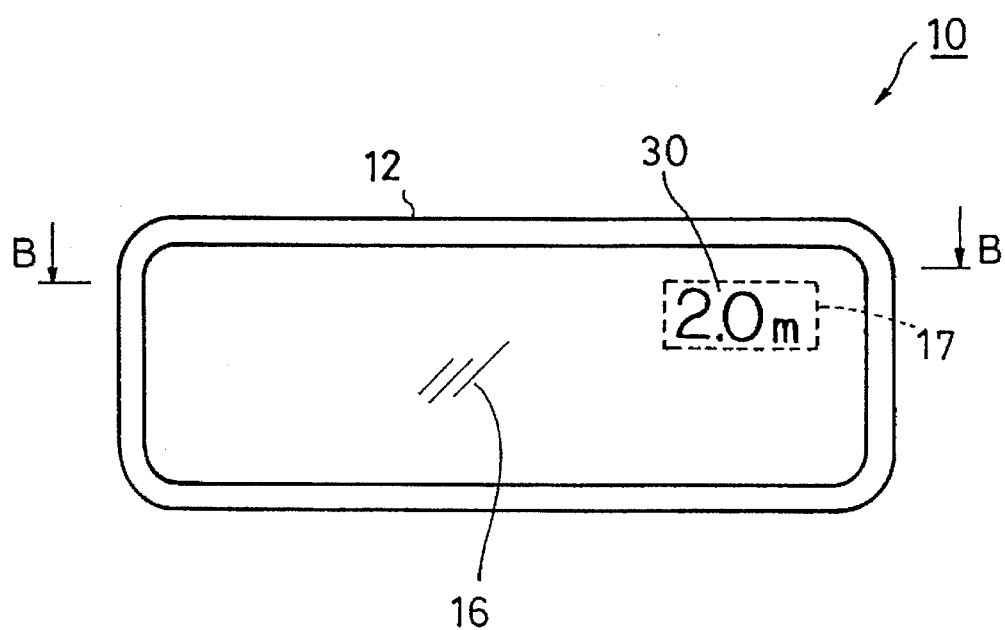
FIG. 3 is a front view of an inner mirror 10 of FIG. 1.

A light emitting display section 18 is provided on a bottom surface 12a (FIG. 2) of the mirror body 12. The light emitting display section 18 is composed of, e.g., a 7-segment LED having a digit of 1 and a digit of 1 decimal place, totalling 2 digits and an LED representing a unit "m". The display section 18 displays, by emission of light, information in a numerical value which represents distance of an obstacle located in the rear of the vehicle detected by an ultrasonic sensor attached to a rear bumper of the vehicle. The top surface of the light emitting display section 18 constitutes a light emitting display surface 18a. One or more slits 22 are defined by light shielding plates 24 for deviating visual information 20 (i.e., emitted light) in a particular direction (obliquely forward upper direction in the embodiment).

In the deviated direction of the visual information 20 is provided an information display mirror 26. The information display mirror 26 reflects on its surface the visual information 20 emitted from the light emitting display section 18 and transmits the reflected visual information 20 to a driver's visual point 28. The optical path of the visual information 20 is extended in this manner by the information display mirror 26 and, therefore, a light emitted display 30 as viewed from the driver's visual point 28 is located behind a back surface 12b of the mirror body 12 with the result that distance of the light emitted display 30 from the visual point 28 is prolonged. Accordingly, the difference in the distance between the position of a rear image reflected by the rear view mirror 16 and the light emitted display 30 is reduced as compared with a case where the light emitting display 30 is made on a mirror surface of the rear view mirror 16, so that it becomes easier for the driver to watch both the light emitted display 30 and the rear image simultaneously whereby rearward driving of the vehicle for, e.g., putting it into a garage etc. is facilitated. Further, the slits 22 prevent diffusion of light in the mirror body 12 and thereby prevents disclosure of the inside of the mirror body 12 to the driver. Moreover, the slits 22 prevent the light emitting surface 18a of the light emitting display section 18 from being exposed directly to the driver's eye. Further, by arranging the slits 22 suitably, it is possible to restrict a range of reaching of the visual information 20 to the direction of the driver.

Figure 4:
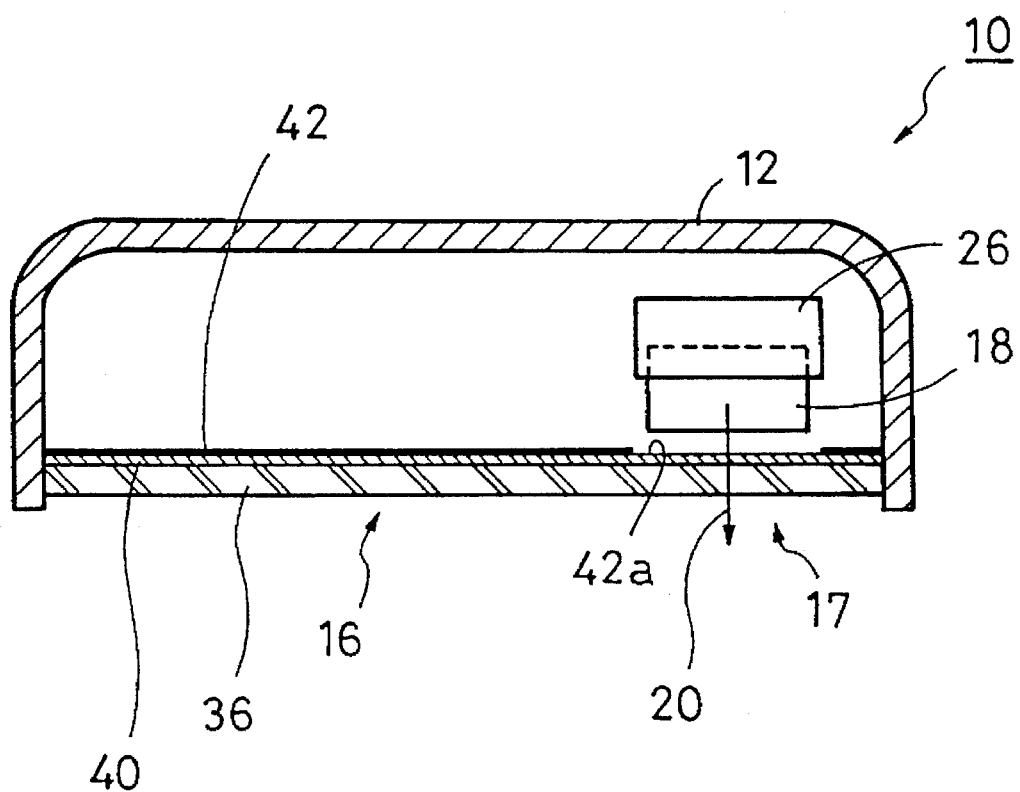
FIG. 4 is a view taken along arrows B—B in FIG. 3 showing another example of the structure of the information display section 17.

Another example of the information display section 17 is shown in FIG. 4. In this example, the rear view mirror 16 is made of a half mirror. More specifically, the rear view mirror 16 is composed of a glass substrate 36, a half transmitting reflecting film 40 attached to the entire back surface of the glass substrate 36 and a black coated film 42 coated on the back surface of the half transmitting reflecting film 40. A part 42a of the black coated film 42 is removed to constitute the information display section 17 through which the visual information 20 is transmitted outwardly.

Figure 5:
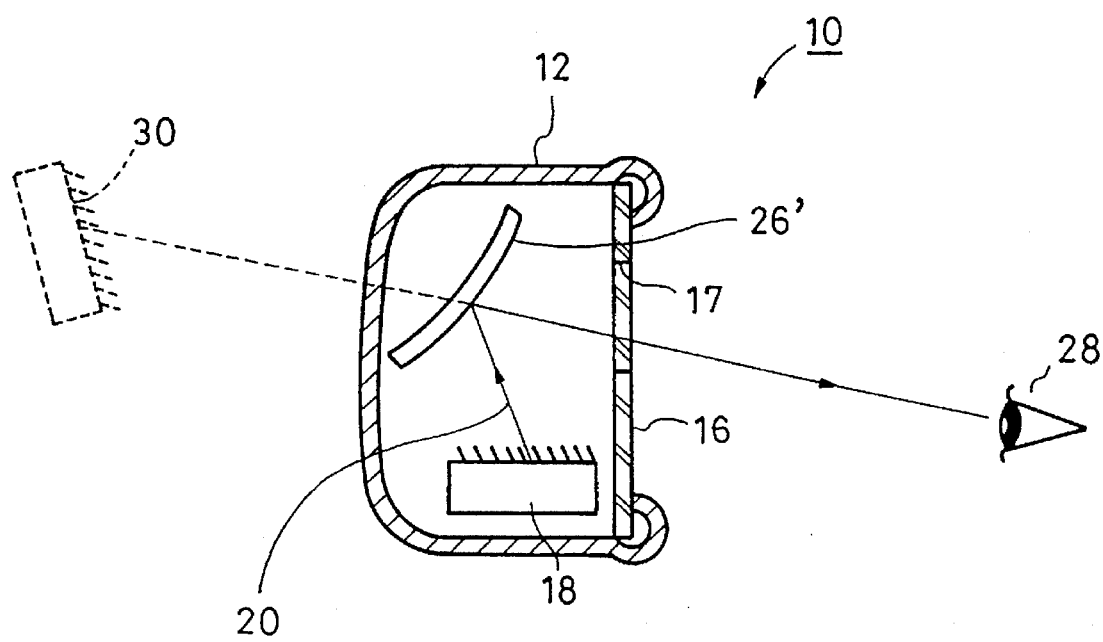
FIG. 5 is a sectional view showing another example of the information display mirror.

In the above described embodiments, a plane mirror is used as the information display mirror 26. Alternatively, as shown in FIG. 5, the information display mirror 26 may be constructed of a convex mirror 26' curved in the vertical direction. In this case, the optical path of the visual information 20 can be prolonged further.

In the above described embodiments, information relating to an obstacle is displayed by numerical value information but this information may be displayed by graphic information or information according to which a warning light is lighted when the vehicle has approached a point which is at a predetermined distance from an obstacle.

This invention is applicable to devices displaying various information other than the information representing an obstacle located in the rear of a vehicle. Such information includes, for example, clearance information representing clearance between four corners of a vehicle and an obstacle which has been detected by a clearance detecting ultrasonic transmitter. Even when information is unrelated to a rear image (i.e., information with which it is not necessary to watch a rear image), the advantageous effect of facilitating watching of the information obtained by prolonging the display position of the information can be obtained. As the light emitting display means, not only an LED but various other types of light emitting display means such as a fluorescent character display tube and a liquid crystal may be used.

What is claimed is:

1. An inner mirror of a vehicle having a display device comprising:

a mirror body;

a rear view mirror, comprising a glass substrate having a front and a rear surface, said rear view mirror being mounted in a front opening of said mirror body as a means for reflecting an image in a rear of a vehicle back to a driver's field of vision, a half transmitting reflecting film having an inner and outer surface, said outer surface of said half transmitting reflecting film being attached to all of said rear surface of said rear view mirror;

an information display section provided within an area of said front surface of said rear view mirror;

a black coated film on said inner surface of said half transmitting reflecting film except for a portion behind said information display section;

light emitting display means provided in said mirror body for displaying visual information by emission of light; and an information display mirror means provided in said mirror body for reflecting the visual information displayed by said light emitting display means back to the driver's field of vision through said information display section.

2. An inner mirror as defined in claim 1 further comprising slit means mounted on said light emitting display means, for directing said visual information displayed by said light emitting display means in a direction of the information display mirror means.

3. An inner mirror as defined in claim 1 wherein the visual information displayed by the light emitting display means is information relating to a distance of an obstacle located to the rear of said vehicle.

* * * * *